United States Patent Office 3,595,761

Patented July 27, 1971

3,595,761

CHEMICAL REDUCTION METAL PLATED DIALLYLPHTHALATE POLYMER AND PREPARATION PROCESS

Edward B. Saubestre, Hamden, Conn., and Lawrence J. Durney, North Caldwell, N.J., assignors to Enthone, Incorporated, West Haven Industrial Park, County of New Haven, Conn.

No Drawing. Continuation-in-part of abandoned application Ser. No. 433,775, Feb. 18, 1965. This application Mar. 5, 1969, Ser. No. 804,713

Int. Cl. C23b 5/64

U.S. Cl. 204—30 6 Claims

ABSTRACT OF THE DISCLOSURE

This invention is concerned with chemical reduction metal-plated diallylphthalate polymers wherein a thin, substantially non-porous, continuous metal layer of fine grain size and consisting essentially of chemical reduction metal is firmly adhered to the polymer surface by a bond strength equivalent to a Pull Test result of at least 5 pounds per inch. One or more metal electroplate layers may be deposited over the chemical reduction metal layer. The invention is also concerned with the preparation of metal-plated diallylphthalate polymers involving the contacting of the polymer surface destined to be metal plated with an alkaline aqueous solution containing about 5 to 45 weight percent of methyl Carbitol and about 5 to 30 weight percent of sodium hydroxide or potassium hydroxide until the polymer surface is converted to a gelled and hydrophilic polymer surface, followed by contacting the gelled hydrophilic surface with a chromic acid- and/or sulfuric acid-containing aqueous acid etchant solution until the polymer surface is converted to a surface readily bondable to electroless metal plating by a firmly adherent bond. The thus-treated polymer surface is then activated and electrolessly metal plated by contact with a chemical reduction metal plating solution until the polymer surface is converted to an electrically conductive surface. The thus-obtained conductive surface can then be electroplated, if desired, with one or more metal electroplate layers.

CROSS-REFERENCES TO A RELATED APPLICATION

This is a continuation-in-part application of our copending U.S. patent application Ser. No. 433,775, filed Feb. 18, 1965, now abandoned.

BACKGROUND OF THE INVENTION

(1) Field of the invention

This invention relates to chemical reduction metal-plated diallylphthalate polymers and more particularly to metal-plated diallylphthalate polymers wherein a thin, substantially non-porous, continuous metal layer of fine grain size and consisting essentially of chemical reduction metal is firmly adhered to the polymer surface by a bond strength equivalent to a Pull Test result of at least 5 pounds per inch.

(2) Description of the prior art

Heretofore procedures for electrolessly plating metal on plastic surfaces necessitated an initial mechanical roughening or deglazing of the surface of the plastic, which was essential to render the surface of the plastic amenable to the application of an adherent metal plating to the plastic surface both through fairly weak chemical bonds and through a mechanical "keying" action arising from the surface irregularities. Conventional conditioning or etching procedures, before the advent of the procedure described in copending U.S. patent application Ser. No. 550,624 of Emons and Saubestre, now Pat. 3,471,313, filed May 17, 1966 as a continuation-in-part of U.S. patent application Ser. No. 303,670, filed Aug. 21, 1963, now abandoned, involved the steps of (1) roughening (deglazing) the plastic surface, and (2) etching the plastic surface employing a chromic acid- and/or sulfuric acid-containing acid etchant solution to produce a hydrophilic plastic surface which was receptive to the aqueous solutions of the chemical reduction metal plating procedure. The most commonly employed etchant solutions for plastics were acid solutions containing chromic acid and sulfuric acid, typical examples of which are as follows:

(1) $CrO_3$—10 oz./gallon
$H_2SO_4$—32 fl. oz./gallon (2) $K_2Cr_2O_7$—15 g.
$H_2SO_4$—100 ml.
$H_2O$—50 ml.

The etching treatment occurs at room temperature for a period of from one to two minutes as required to produce the desired hydrophilic surface, and such treatments have been successfully employed on thermoplastic resins such as the acrylics, casein, cellulosics, epoxies, phenolics, polyamides, styrenes and vinyls. In addition to this all around etching procedure, phenolics, cellulosics and ureaformaldehyde resins may be etched or conditioned to obtain the desired hydrophilic surface by contact with a solution such as the following:

$H_2SO_4$—2 gallons
$HNO_3$—1 gallon
HCl—1 fl. oz.
$H_2O$—1 quart

After etching, the part is rinsed thoroughly and preferably neutralized with a dilute aqueous alkali solution. In addition, urea-formaldehyde resins may be first roughened in a 10% hydrochloric acid solution and then further etched in a 1% ferrous ammonium sulfate aqueous solution for a period of approximately 15 minutes. A further approach to the etching procedure is to follow up mechanical treatment with the use of a solvent type etch which will convert the surface of the plastic to the desired hydrophilic condition. In some cases the plastic surface or substrate will not respond to the above chemical etching treatment and, therefore, must be treated in a solvent type etch which is the situation, for example, with ordinary rubber and certain fully cured thermosetting plastics.

The next step in prior procedures is the sensitization of the thereby formed hydrophilic plastic surface by the absorption thereon of a readily oxidizable material to enable later deposit of a catalyst film. The conventional sensitization step involves, usually the use of a stannous chloride- and HCl-containing aqueous acid sensitizer solution. While not intended to be restrictive, the followng has been found to be a good sensitizer:

$SnCl_2$—10 g.
HCl—40 ml.
$H_2O$—1,000 ml.

Various other sensitization procedures may be employed as described in aforementioned U.S. patent application Ser. No. 550,624.

Following sensitization, in prior methods, the sensitized plastic surface is then contacted with an activator solution containing a noble metal salt whereby the metal salt whereby the metal is reduced and deposited on the plastic surface, thereby acting as a catalytic surface for localizing further plating procedures. Virtually all of the noble metals and certain non-noble metals which are readily reduced by stannous chloride, are catalytic for the common electroless plating solutions, including the noble metals gold, silver and the platinum group metals, and the non-noble metals nickel and copper. The platinum group metals and especially palladium are most commonly employed for providing the catalytic surface. While not intended to be restrictive, the following has been found to be a useful activator:

$PdCl_2$—1 g.
HCl—10 ml.
$H_2O$—1 gallon.

The next step in the prior art methods is the conversion of the plastic surface to an electrically conductive one by applying a thin metallic coating from a chemical reduction plating solution. Metals applied in this way are for example, copper, silver and nickel. Suitable plating baths or formulations for the chemical reduction metal plating are given in the article by E. B. Saubestre entitled "Electroless Plating Today," Metal Finishing 60, No. 6, 67–73; No. 7, 49–53; No. 8, 45–49; No. 9, 59–63 (1962), but are not intended to be restrictive. After electroless plating is accomplished, the conductive plastic surface is usually placed in a copper electroplating bath and about 2 to 5 mils of copper are electroplated onto the surface. The thus-plated surface, according to prior art procedure, must then be suitably polished or buffed and then electroplated with bright nickel and finally electroplated with chromium or gold, or with another metal or combination of metals to provide a decorative or non-decorative outer surface as desired on the plastic substrate.

By use of the process of the aforementioned copending Emons and Saubestre application Ser. No. 550,624, which involves the use of an etchant solution containing phosphate ions, mechanical roughening is entirely eliminated thereby permitting the use of conventional automatic plating equipment. Also by the procedure of copending application Ser. No. 550,624, subsequent electrodeposits, if produced from bright plating formulations, will be bright abinitio, thus elminating polishing or burnishing, an expensive and troublesome manual or semi-manual operation.

The plastics especially amenable to the etching step of aforementioned Emons and Saubestre application Ser. No. 550,624 and plateable with satisfactory results by the chemical reduction metal plating process of application Ser. No. 550,624 are acrylics, acrylonitrile-butadiene-styrene, casein, cellulosics, epoxies, phenolics, polyacetals, polyamides, styrenes and vinyl resins and modifications of the same.

Although the special etchant solutions of the aforementioned copending Emons and Saubestre U.S. application Ser. No. 550,624 produce surfaces on most plastics which are especially amenable to application of a chemical reduction metal plating layer or coating which is strongly or firmly adherent to the polymer surface, the procedure of Emons and Saubestre application Ser. No. 550,624, as well as prior art chemical reduction metal plating procedures are not satisfactory when applied to diallylphthalate polymers inasmuch as the chemical reduction metal plating layer exhibits little or no adherence to the diallylphthalate polymer. And any adherence of the metal plating to the diallylphthalate polymer surface that is obtained is only a weak adherence considerably below a Pull Test result of five pounds per inch. Although it is not known with certainty, it is believed that the problem heretofore in the arts inability to plate diallylphthalate polymers with a firmy adherent chemical reduction metal plating layer resided in the allyl double bond configuration or linkages in the polymer being exceptionally resistant to hydrolysis, which is believed necessary to render the polymer amenable to subsequent steps of the chemical reduction metal plating process.

Diallyphthalate polymers are thermosetting polymers of commercial importance due to the excellent electrical and physical characteristics and chemical resistance of the polymers. Metal-plated diallylphthalate polymers have utility in electronic and electrical components and instruments such as, for example, multi pronged connectors for electronic circuits, potentiometers, and printed circuit boards. Another use of metal-plated and unplated diallylphthalate polymer is in handles of household appliances. A commercially availably diallylphthalate polymer is sold under the trademark name "Dapon."

SUMMARY OF THE INVENTION

In accordance with the present invention, it was found that firm adherence of the chemical reduction metal plating to the diallyphthalate polymer surface was attained provided the diallylphthalate polymer surface was contacted with an aqueous alkaline solution containing, by weight, about 5 to 25 percent of methyl Carbitol and about 5 to 30 percent of sodium hydroxide or potassium hydroxide until the polymer surface was converted to a gelled and hydrophilic surface, prior to the acid etching or conditioning, activating and electroless metal plating steps of the conventional or prior chemical reduction metal plating process. In fact the adherence of the chemical reduction metal plating to the diallylphthalate polymer surface of the product plated polymer of this invention was so strong that efforts to disbond and peel the chemical reduction metal plating from the diallylphthalate polymer surface were unsuccessful, and instead the polymer of the substrate tore with the metal plating still adhering thereto. The process of this invention involves contacting the surface of the diallylphthalate polymer characterized by carbon to carbon double bonds in the polymer chain, with an aqueous alkaline solution containing 5 to 25 weight percent of methyl Carbitol and about 5 to 30 weight percent of sodium hydroxide or potassium hydroxide until the polymer surface is converted to a gelled and hydrophilic polymeric surface. The thus-obtained gelled, hydrophillic polymer surface is contacted with an aqueous acid etchant solution containing at least one acid from the group of chromic acid and sulfuric acid until the polymer surface becomes readily bondable to electroless metal plating by a firmly adherent metal to polymer bond, followed by activating the hydrophilic readily bondable polymer surface to deposit a thin stratum or layer of microscopic particles of a metal catalytic to the reduction of metal ions of a corresponding chemical reduction metal plating solution. A thin metal coating is electrolessly plated on the activated surface by contacting the surface with a chemical reduction metal plating solution until the polymer surface is converted to an electrically conductive surface.

A thin copper layer is then usually electroplated on the electrolessly metal plated surface of the polymer. The copper electroplating is effected in a conventional copper plating bath of the acid sulfate, fluorobate, or sulfamate type, or of the alkaline pyrophosphate type and in conventional manner. A final metal plating or platings of, for example, nickel-chromium or nickel-gold, can then be electroplated on the copper electroplated on the copper electroplate layer, if desired, to provide a decorative or non-decorative outer surface on the polymer substrate.

If not already clean, the diallylphthalate polymer surface to be metal plated should be cleaned prior to the treatment with the aqueous alkaline solution. The cleaning when required, can be effected with a conventional alkaline, non-silicated cleaner solution, for instance an aqueous solution containing 180 grams per liter of NaOH, 24 grams liter of $NaNO_3$, and 36 grams per liter of $NaNO_2$.

The metal-plated diallylphthalate polymer article or object of this invention comprises the diallylphthalate article having a thin stratum of microscopic particles or grains of a metal catalytic to the reduction of the metal ions of a chemical reduction metal plating solution on the polymer surface, and a thin, substantially non-porous continuous, finely-grained metal plating layer over the thin stratum of microscopic particles and firmly adhered to the polymer surface. The metal plating layer consists essentially of chemical reduction metal, has a thickness not in excess of 4 mils thickness, and is adhered to the diallylphthalate polymer surface with a bond strength equivalent to a pull test result of 5 pounds per inch or higher. The stratum of microscopic catalytic metal particles may be a continuous or discontinuous stratum. The chemical reduction metal plating can be, for example, of copper, nickel, cobalt and certain alloys thereof, e.g. nickel-cobalt alloys. By "microscopic" as used herein in referring to the catalytic metal particles of the thin stratum is meant particles of such small size as to be readily visible only with the aid of a microscope.

The chemical reduction metal plating layer of the plated diallylphthalate polymer is preferably of thickness in the range of about 0.5–2 mils.

The size of the fine grains of the metal of the chemical reduction metal plating layer herein, e.g. chemical reduction copper, nickel or cobalt plating layer, is usually that wherein the largest dimension of the grain is of an average size or magnitude no greater than 5 microns, and preferably in the range of about 1–3 microns.

The catalytic metal of the microscopic particles of the thin stratum located on the polymer surface beneath the chemical reduction metal plating layer can be any metal which is catalytic to, i.e. catalyzes, the reduction of the metal ions of a chemical reduction metal plating solution, for example the copper, nickel or cobalt ions of a chemical reduction copper nickel, or cobalt plating solution which are well known to the art, to zero valent metal. Thus the catalytic metal microscopic particles can be, for example, a noble metal, e.g. a precious metal such as a platinum group metal, e.g. palladium and platinum, gold and silver; or a non-noble metal such as, for example nickel and copper.

The non-porosity and continuity of the chemical reduction metal, for instance copper or nickel, of the metal-plated diallylphthalate polymer of this invention is of importance for electrical conductivity purposes in the electronic applications of the metal-plated polymer, and for decorative purposes in non-electronic or non-electrical uses of the plated polymer. The fine grain size of the chemical reduction metal layer of the metal-plated polymer article of this invention is also of importance for the reason that the metal plating, although not ductile, is less frangible due to its smaller grain which is typically an extremely fine grain size than is a coarse-grained metal coating or layer, such as a metal coating deposited from a suspension of finely powdered metal particles in a liquid medium such as, for instance, acetone. The firm adherence of the chemical reduction metal plating of the metal-plated polymer article of this invention, which is a metal to polymer adherence with a bond strength equivalent to a Pull Test result of 5 pounds per inch or higher, is also important in the plated article inasmuch as certain electronic and electrical components and instruments in which the metal-plated diallylphthalate polymer article herein is suitable for use, require a strong or firm metal-to-polymer bond. This firm adherence is contrasted with the relatively weak or non-adherence of a metal layer deposited on the polymer from a suspension of powdered metal particles in acetone or other liquid which would adhere to the polymer surface with a bond strength considerably less than 5 pounds per inch if it adhered to the polymer. This weak adherence would render the product article produced by applying the metal particles from the suspension in acetone or other liquid unsatisfactory for use in production of the electronic and electrical components and instruments previously mentioned herein.

DESCRIPTION OF THE PREFERRED EMBODIMENTS

The diallylphthalate polymer surface is contacted with the aqueous alkaline solution containing the methyl Carbitol and sodium hydroxide or potassium hydroxide preferably by immersion of the polymer surface therein, and for a contact time preferably of from about 8 to 12 minutes at a temperature of the alkaline solution preferably of about 170° F. to 180° F.

The polymer surface is preferably sensitized after the acid etchant contacting step and prior to the activating step. The sensitizing is effected by contacting the polymer surface with an aqueous sensitizer solution, usually by immersing the polymer surface in the sensitizer solution until sensitized.

The polymer surface is preferably water rinsed after each step of the process and prior to the next succeeding step.

Orthophosphoric acid is preferably employed as a constituent of the acid etchant solution together with the sulfuric and chromic acids. The orthophosphoric acid is the preferred source of the phosphate ions. Such acid etchant solutions are disclosed in aforementioned copending U.S. patent application Ser. No. 550,624. The orthophosphoric acid can be omitted from the acid etchant solution in a less preferred acid etchant solution, and such etchant solution can be one of the chromic acid- and/or sulfuric acid-containing acid etchants previously disclosed herein in the "Description of the Prior Art" section which are free of phosphate ions.

The following Examples 1 and 2 are illustrative of plating cycles for electrolessly metal plating the diallylphthalate polymer in accordance with the present invention, but are not intended to be restrictive thereof:

EXAMPLE 1

Step 1

The diallylphthalate polymer surface is first subjected to a cleaning treatment by immersion in a non-silicated, alkaline cleaner, preferably in a concentration of 60 grams per liter at a temperature of 140° F. for a period of from 1 to 2 minutes, followed by cold water rinse.

Step 2

The cleaned diallylphthalate polymer surface is subjected to a gelling solvent treatment by immersion in a solution containing 20 percent by weight sodium hydroxide, 10 percent by weight of methyl Carbitol, and 70 percent by weight of water at a temperature of 170° F. for a period of ten minutes followed by cold water rinse.

Step 3

The third phase of the process involves the treatment of the thus-treated polymer surface with an etchant or conditioning solution preferably of the type employed in the aforementioned copending U.S. patent application Ser. No. 550,624. Etchant solutions which may be employed in this phase of the process are typically as follows:

| | Percent | | | |
|---|---|---|---|---|
| | $H_2SO_4$ | $H_2PO_4$ | $CrO_3$ | $H_2O$ |
| Composition No.: | | | | |
| 1 | 40.0 | 39.5 | 3.0 | 17.5 |
| 2 | 53.0 | 22.0 | 1.7 | 23.3 |
| 3 | 71.3 | 22.0 | 1.7 | 5.0 |
| 4 | 53.0 | 40.0 | 1.7 | 5.3 |
| 5 | 53.0 | 22.0 | 1.0 | 24.0 |

The polymer surface was immersed in the etchant solution, maintained therein at a solution temperature of 200° F., for a period of 30 minutes, and then given a cold water rinse.

Step 4

Sensitization involves immersion of the etched diallylphthalate polymer surface for one minute at room temperature in a solution of the following composition:

$SnCl_2$—10 g.
HCl—40 ml.
$H_2O$—1,000 ml.

Cold rinsing after sensitizing should be thorough.

Step 5

The sensitized polymer surface is then immersed in an activator solution to activate the surface and render the same receptive to the application of metal coatings by electroless and usually also electroplating procedures. While not intended to be restrictive, the following activator is a preferred activator.

$PdCl_2$—1 g.
HCl—10 ml.
$H_2O$—1 gallon

Cold water rinsing after activation should be thorough. A thin stratum of microscopic particles or grains of catalytic palladium is deposited on the polymer surface by this activating.

Step 6

The diallylphthalate polymer surface is next rendered electrically conductive by depositing copper, nickel or silver by chemical reduction. Suitable chemical reduction plating bath formulas are given in the article by E. B. Saubestre, "Electroless Plating Today," Metal Finishing 60, No. 6, 67–73; No. 7, 49–53; No. 8, 45–49; No. 9, 59–63 (1962), but are not intended to be restrictive. Plating is continued until the polymer surface is fully conductive. Specifically, an electroless copper plate may be applied by immersion of the polymer at room temperature in a copper salt- containing chemical reduction copper plating solution for a period of 30 minutes followed by cold water rinse.

Step 7

The diallylphthalate polymer surface is then electroplated in a conventional copper electroplating solution of the acid sulfate, fluoborate, or sulfamate type, or of the alkaline pyrophosphate type. If the polymer surface is to have a final bright decorative finish, the plating solution should contain brighteners as is well known to the art. Copper plating may be of 0.1–1.5 mils thickness. In a specific example, the diallylphthalate polymer surface is given an acid copper plate to a thickness of 1 mil at room temperature.

Step 8

The copper electroplating can be followed by any desired final electroplating, such as, for example, nickel-chromium or nickel-gold.

EXAMPLE 2

Step 1

The diallylphthalate polymer surface is first subjected to a cleaning treatment by immersion in a non-silicated, alkaline cleaner solution preferably of a concentration of 60 grams of the cleaner concentrate per liter at a temperature of 140° F. for a period of from 1 to 2 minutes, followed by a cold water rinse.

Step 2

The cleaned diallylphthalate polymer surface is subjected to a gelling solvent treatment by immersion in a solution containing 20 percent by weight sodium hydroxide, 10 percent by weight of methyl Carbitol, and 70 percent by weight of water at a temperature of 170° F. for a period of ten minutes followed by a cold water rinse.

Step 3

The thus-treated polymer surface was then subjected to treatment in an etchant solution of the composition set forth in Composition No. 1 of Step 3 of Example 1 at a temperature of 180° F. for a period of 5 minutes followed by a cold water rinse.

Step 4

Sensitization involves immersion of the etched diallylphthalate polymer surface for one minute at room temperature in a solution of the following composition:

$SnCl_2$—10 g.
HCl—40 ml.
$H_2O$—1,000 ml.

Rinsing after sensitizing should be thorough.

Step 5

The sensitized polymer surface is then subjected to treatment to activate the surface and render the same receptive to the application of metal coatings by electroless or electroplating procedures. While not intended to be restrictive, the following activator is a preferred activator:

$PdCl_2$—1 g.
HCl—10 ml.
$H_2O$—1 gallon

Cold water rinsing after activation should be thorough. A thin stratum of microscopic particles of catalytic palladium is deposited on the polymer surface as a result of this activating.

Step 6

The diallylphthalate polymer surface is next rendered electrically conductive by depositing copper, nickel or silver by chemical reduction. Suitable formulas are given in the article by E. B. Saubestre, "Electroless Plating Today," Metal Finishing 60, No. 6, 67–73; No. 7, 49–53; No. 8, 45–49; No. 9, 59–63 (1962) but are not intended to be restrictive. Plating is continued until the surface to be plated is fully conductive. Specifically, an electroless copper plate may be applied by immersion of the product at room temperature in a copper salt-containing chemical reduction copper plating solution for a period of 30 minutes followed by cold water rinse.

Step 7

The diallyphthalate polymer surface is then electroplated in a conventional copper electroplating solution of the acid sulfate, fluoborate, or sulfamate type, or of the alkaline pyrophosphate type. If the part is to have a final bright decorative finish, the plating solution should contain brighteners. Copper plating may be of 0.1–1.5 mils thickness. In a specific example, the diallylphthalate polymer is given an acid copper plate to a thickness of 1 mil at room temperature.

Step 8

The copper electroplating can be followed by any desired final electroplating, such as nickel-chromium, nickel-gold, and like.

Step 9

The thus-plated polymer product was then given a baking treatment in an oven at a temperature of 250° F. for a time period of one hour.

EXAMPLE 3

A plurality of printed circuit component parts of diallylphthalate polymer of dimensions of 1 inch by 1 inch square were immersed for 5 minutes in aqueous alkaline solution containing methyl Carbitol and sodium hydroxide at a solution temperature of 170° F. and of the following composition:

| | Percent by wt. |
|---|---|
| NaOH | 20 |
| Methyl Carbitol | 7 |
| Sodium gluconate | 7 |
| $H_2O$ | 66 |

The parts were then removed from the solution and the surfaces of the parts were gelled, i.e. had a gel structure, due to the immersion in such aqueous alkaline solution. The parts were then rinsed in cold water.

The parts were then immersed for 5 minutes in a sulfuric acid- and $CrO_3$-containing aqueous acid etchant solution at a solution temperature of 180° F., followed by removal of the parts from the etchant solution and rinsing the parts in cold water. The thus-treated parts were immersed for 1 minute in a stannous chloride- and HCl-containing sensitizer aqueous solution at room temperature of the solution. The parts were then removed from the sensitizer solution and rinsed in cold water. The parts were then immersed in a palladous chloride- and HCl-containing activator aqueous solution for 1 minute with the solution at room temperature. The parts were then removed from the activator solution and rinsed in cold water.

A thin stratum of microscopic particles or grains of catalytic palladium metal was deposited on the polymer surface as a result of such activating.

The parts were then immersed for 10 minutes in a chemical reduction aqueous copper plating bath with the bath at room temperature. After such electroless copper plating of the polymer surfaces the parts were removed from the bath and rinsed in cold water. The parts were then immersed in an acid bright copper aqueous electroplating bath and connected in electrical circuit therein as cathodes. The parts were electroplated in the bath at a current density of 30 amps per square foot for about 20 minutes.

The parts were then tested for strength of adherence of the copper plate to the diallylphthalate polymer by hand with the aid of a pen knife. The conventional Pull Test could not be carried out due to the irregular and uneven surfaces of the parts, inasmuch as a strip of the plated copper sufficiently wide and sufficiently long to enable the Pull Test to be conducted could not be cut due to the irregular surfaces of the parts. Instead of the Pull Test, slits were made on the copper plated parts with a pen knife, the edge of the copper plate gripped between the knife blade and finger and the copper plate pulled outwardly and forwardly. This diallylphthalate polymer of the plated panels tore during the test while the copper to diallylphthalate polymer bond remained completely intact, which evidenced the good firm adherence or bonding of the copper plate to the diallylphthalate polymer. The bond strength of the metal plating layer adhered to the diallylphthalate polymer surface was estimated to be equivalent to a Pull Test result considerably in excess of 5 pounds per inch.

EXAMPLE 4

A plurality of printed circuit component parts of diallylphthalate polymer of dimensions of about 1 inch by 1 inch square were immersed for five (5) minutes in the aqueous acid etchant solution of the same composition as that of the aqueous acid etchant solution of Example 3 and at a temperature of 180° F., then removed from the solution and rinsed in cold water, followed by sensitizing the parts by immersing them for one (1) minute in a sensitizer solution of the same composition as that of the sensitizer solution of Example 3 and at room temperature. The parts were then removed from the sensitizer solution, rinsed in cold water, and then activated by immersion for one (1) minute in an activator solution of the same composition as that of the activator solution of Example 3 and at room temperature. The parts were then removed from the activator solution followed by rinsing in cold water. The parts were then immersed for ten (10) minutes in a chemical reduction copper plating bath of the same composition as that of the chemical reduction copper plating bath of Example 3 and at room temperature. The parts were then removed from the copper plating bath, followed by rinsing the parts in cold water. The parts were then immersed in an acid bright copper electroplating bath of substantially identical composition as that of the copper electroplatnig bath of Example 3 and at room temperature, and the parts were copper electroplated therein at a current density of thirty (30) amps per square foot for about twenty (20) minutes. The parts were then removed from the electroplating bath.

The parts were then tested for strength of adherence of the copper plate to the diallylphthalate polymer by hand with the aid of a pen knife in a substantially identical manner as in conducting the strength of adherence tests of Example 3. No appreciable bond or adherence of the copper plate to the polymer was found on any of the thus-plated diallylphthalate polymer parts.

The foregoing test date of Examples 3 and 4 shows that the conventional procedure of Example 4 utilized to electrolessly metal plate diallylphthalate polymer surfaces and not employing a conditioning or treatment of such polymer surfaces with an aqueous alkaline solution of methyl Carbitol prior to the etching with the aqueous solution of $H_2SO_4$, $H_3PO_4$ and $CrO_3$, resulted in no appreciable adherence of the metal plate to the diallylphthalate polymer. However the treatment or conditioning of the diallylphthalate polymer surfaces by the procedure of Example 3, which is in accordance with the present invention, involving the contacting of the polymer surfaces with the aqueous alkaline solution comprising methyl Carbitol and sodium hydroxide, prior to the treatment with the aqueous acid etchant solution, resulted in good firm adherence of the metal plate to the diallylphthalate polymer surfaces.

The "Pull Test" is a well known test utilized in industry for testing strength of adherence of a metal plating or coating to a plastic or polymer surface. In the test, a narrow strip of ½" to 1" width of the relatively thin (1.5–2.0 mils) metal plating or coating, e.g. an electroless copper, nickel or cobalt plating, is pulled at a 90° angle from the underlying plastic or polymer surface. The force required, either to initiate or sustain at a steady rate, peeling of the metal from the surface is recorded as the numerical value or result for the test. The "Pull Test" is described in the publication "Plating," 52, pages 999–1000 (1965) by Saubestre et al.

What is claimed is:

1. A process for the metal plating of a diallylphthalate polymer surface, which comprises contacting the surface of the diallylphthalate polymer characterized by carbon to carbon double bonds in the polymer chain with an aqueous alkaline solution containing about 5 to 25 weight percent of methyl Carbitol and about 5 to 30 weight percent of a material selected from the group consisting of sodium hydroxide and potassium hydroxide until the polymer surface is converted to a gelled and hydrophilic polymer surface, contacting the thus-obtained gelled, hydrophilic polymer surface with an aqueous acid etchant solution containing at least one acid selected from the group consisting of chromic acid and sulfuric acid until the polymer surface becomes readily bondable to electroless metal plating by a firmly adherent metal to polymer bond, activating the hydrophilic, readily bondable polymer surface, and electrolessly plating a thin metallic coating on the activated surface by contacting said surface with a chemical reduction metal plating solution until the polymer surface is converted to an electrically conductive surface.

2. The process of claim 1 wherein the diallylphthalate polymer surface is contacted with the aqueous alkaline solution by immersion of the polymer surface in the aqueous alkaline solution for a time of about 8 to 12 minutes at a solution temperature of about 70° F. to 180° F.

3. The process of claim 1 further characterized by electroplating a thin copper layer on the electrolessly metal plated surface.

4. The process of claim 1 wherein the hydrophilic, readily bondable polymer surface is sensitized prior to being activated.

5. The process of claim 3 further characterized by electroplating a final metal plating on the copper electroplate layer.

6. The process of claim 1 wherein the acid etchant solution contains chromic acid, sulfuric acid and phosphate ions.

References Cited

UNITED STATES PATENTS

| | | | |
|---|---|---|---|
| 3,471,313 | 10/1967 | Saubestre et al. | 117—47 |
| 3,471,376 | 10/1967 | Saubestre et al. | 204—30 |

FREDERICK C. EDMUNDSON, Primary Examiner

U.S. Cl. X.R.

204—20, 27; 29—195

PO-1050
(5/69)

UNITED STATES PATENT OFFICE
CERTIFICATE OF CORRECTION

Patent No. 3,595,761 Dated July 27, 1971

Inventor(s) Edward B. Saubestre and Lawrence J. Durney

It is certified that error appears in the above-identified patent and that said Letters Patent are hereby corrected as shown below:

Column 3, line 3, "whereby the metal" should be deleted; line 4, "salt" should be deleted, line 47, "elminating" should read --eliminating--. Column 4, line 2, "firmy" should read --firmly--; line 64, "fluorobate" should read --fluoborate--. Column 6, line 70, "$H_2PO_4$" should read --$H_3PO_4$--. Column 10, line 0,"electroplatnig" should read --electroplating--.

Signed and sealed this 18th day of January 1972.

(SEAL)
Attest:

EDWARD M.FLETCHER,JR.
Attesting Officer

ROBERT GOTTSCHALK
Acting Commissioner of Patents